US009443134B2

(12) United States Patent
Gupta et al.

(10) Patent No.: US 9,443,134 B2
(45) Date of Patent: Sep. 13, 2016

(54) PROPAGATING OBJECT SELECTION ACROSS MULTIPLE IMAGES (71) Applicant: Adobe Systems Incorporated, San Jose, CA (US)

(72) Inventors: Sourabh Gupta, Noida (IN); Saurabh Gupta, Noida (IN); Ajay Bedi, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 19 days.

(21) Appl. No.: 14/279,059

(22) Filed: May 15, 2014

(65) Prior Publication Data
US 2015/0332119 A1 Nov. 19, 2015

(51) Int. Cl.
G06K 9/00 (2006.01)
G06K 9/62 (2006.01)
G06K 9/64 (2006.01)
G06K 9/46 (2006.01)

(52) U.S. Cl.
CPC ......... *G06K 9/00295* (2013.01); *G06K 9/4671* (2013.01); *G06K 9/6201* (2013.01); *G06K 9/6202* (2013.01); *G06K 9/6217* (2013.01); *G06K 9/64* (2013.01)

(58) Field of Classification Search
CPC .......................... G06K 9/6201; G06K 9/4671
See application file for complete search history.

(56) References Cited

U.S. PATENT DOCUMENTS

| | | | | |
|---|---|---|---|---|
| 6,441,846 B1 * | 8/2002 | Carlbom | ............ | A63B 24/0021 348/157 |
| 8,351,713 B2 * | 1/2013 | Sun | ...................... | H04N 1/3876 348/584 |
| 8,873,850 B2 * | 10/2014 | Krishnaswamy | ..... | G06T 7/0002 382/118 |
| 2004/0130546 A1 * | 7/2004 | Porikli | ................... | G06K 9/342 345/423 |
| 2010/0054596 A1 * | 3/2010 | Yun | ........................ | G06K 9/344 382/173 |
| 2012/0121132 A1 * | 5/2012 | Asahara | ............ | G06K 9/00201 382/103 |
| 2012/0288155 A1 * | 11/2012 | Dhawan | ................ | G06T 7/2033 382/103 |
| 2014/0218353 A1 * | 8/2014 | Solem | ..................... | G06T 19/20 345/419 |
| 2014/0237365 A1 * | 8/2014 | Oberbrunner | ........ | G11B 27/034 715/722 |
| 2014/0341425 A1 * | 11/2014 | Babacan | ............ | G06K 9/00228 382/103 |

* cited by examiner

*Primary Examiner* — Kim Vu
*Assistant Examiner* — Molly Delaney
(74) *Attorney, Agent, or Firm* — Wolfe-SBMC (57) ABSTRACT

Propagating object selection across multiple images is described. In one or more embodiments, an object is selected from a first image according to selection inputs. Features that are representative of the selected object are then ascertained. To propagate selection of the object to the second image, a determination is made as to whether the second image includes features that resemble those ascertained from the first image. Once a determination is made as to the features of the second image that resemble the features of the first image, the second image is divided into regions. Each of the regions includes pixels that are similar within the region, one pixel to another. The regions of the second image that include the features resembling those ascertained from the first image are then combined. The combined regions are used to select the object from the second image without receiving selection inputs to do so.

20 Claims, 8 Drawing Sheets

PROPAGATING OBJECT SELECTION ACROSS MULTIPLE IMAGES

BACKGROUND

Object selection is one of the most frequently performed tasks in photo processing. Object selection is generally performed in photo processing to select a region of a given image for application of one or more visual effects e.g., color change, contrast change, saturation change, blurring effects, and the like. For example, a wedding photographer, who has taken several photographs of a wedding, may wish to apply visual effects to a bride and groom in each of the photographs in which they appear.

Using conventional techniques, the photographer can, through an image editor application, select the bride and groom in each image and then apply the desired visual effects thereto. Selecting an object and applying visual effects to that object in even a single image can be time-consuming though. Further, when the object is selected and visual effects are applied for many images, the time involved may increase proportionally with the number of images. Consequently, the amount of time it takes, using conventional techniques, to apply visual effects to objects in multiple images may discourage users from doing so for some of those images.

SUMMARY

Propagating object selection across multiple images is described. In one or more embodiments, an object is selected from a first image according to selection inputs. Features that are representative of the selected object are then ascertained. To propagate selection of the object to the second image, a determination is then made as to whether the second image includes features that resemble those ascertained from the first image. Once a determination is made as to the features of the second image that resemble the features of the first image, the second image is divided into regions. Each of the regions includes pixels that are similar within the region, one pixel to another. The regions of the second image that include the features resembling those ascertained from the first image are then combined. The combined regions are used to select the object from the second image without receiving selection inputs to do so.

Additionally, visual effects that are applied relative to an object in one image may be propagated to the object in other images. To do so, selection inputs are received to select the object in the image. That selection is then propagated to other images such that the object is automatically selected from the other images e.g., without receiving selection inputs to select the object individually from the other images. Visual effects (e.g., color change, contrast change, and the like) may be applied relative to the object selected in the image according to effect application inputs. Based on the automatic selection of the object from the other images, the visual effects can then be applied automatically to the object in the other images, e.g., without receiving effect application inputs to apply the visual effect to the other images.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Selecting an object from an image and applying visual effects to the selected object may be time-consuming for a user. With conventional techniques, a user may repeat this process for each image to which they wish to apply the desired visual effects. Consequently, the time commitment to apply visual effects to an object in multiple different images using conventional techniques may be proportional to the number of images. Due to this time commitment, users may be discouraged from applying visual effects to some images, and thus limit the images to which they ultimately decide to apply the visual effects.

Propagation of object selection across multiple images is described. In one or more embodiments, a user performs selection inputs to manually select an object in an image. Based on the user's selection in the image, the object is then automatically selected from other images that are chosen for propagation of the selection. In other words, the object is selected from the other images without involving selection by the user of the object from the other images.

Consider an example in which a wedding photographer has uploaded several digital images taken of a wedding. As part of processing the images, the photographer may perform selection inputs to select the bride and the groom from an image, e.g., the photographer may use a cursor to draw a line around the bride and groom, select multiple suggested regions of the image, and so on. The photographer may then choose other images of the wedding from which the bride and groom are to be selected. Using the techniques described herein, the bride and groom are automatically selected from the other images based on the photographer's selection from the one image. The selection of the bride and groom from the other images is considered "automatic" because it is performed without receiving additional input from the photographer to draw a line around the bride and groom, select multiple suggested regions of the other images, and so on.

In another example, a photographer may upload several images that include wildlife, such as a particular bird. As part of processing the images, the photographer may perform selection inputs to select the particular bird from an image. The photographer may then choose other images from which the particular bird is to be selected. Using the techniques described herein, the particular bird is then automatically selected from the other images based on the photographer's selection from the one image.

To propagate selection of an object from one image to other images, features that are representative of the object selected from the one image are first ascertained. For example, the features may be extracted from the one image using a scale invariant transform (SIFT). Objects appearing in a given image generally correspond to several points in the given image that represent the object uniquely. Using SIFT, those points can be extracted from the given image to provide a feature description of the object.

A determination is then made as to whether the other images include feature that resemble those ascertained from the one image. Once a determination is made as to the features of the other images that resemble the features of the one image, the other images are divided into regions. For each of the other images, the regions that include the features resembling those ascertained from the one image are combined. The combined regions are used to automatically select the object from the other images. In some cases, the combined regions cover an entirety of an object that is to be selected from the other images. In such cases, a selection of the object from the other images may be formed using solely the combined regions. In other cases, the combined regions may merely cover a perimeter of the object that is to be selected from the other images. This may be the case where the perimeter of the object is interesting (e.g., includes extractable features), but where the inside of the object is not interesting (e.g., is all a substantially similar color with little or no contrast). In these cases, a selection of the object from the other images may be formed using the combined regions as well as regions enclosed by the combined regions. Doing so enables selection of the object as a whole, including a center of the object that may lack features of interest.

In one or more embodiments, visual effects applied to a selected object in one image may also be propagated to other images. Effect application inputs may be received from a user to apply visual effects to a selected object in an image. The visual effects may then be automatically applied to other images.

Continuing with the example of the wedding photographs, the wedding photographer may wish to apply a visual effect to each of the images in which the bride and the groom appear. For example, the photographer may wish to show the bride and groom in color and the other parts of an image in black and white. To achieve this effect in a first image, the photographer may select the bride and groom from the first image and apply a black and white filter to the rest of the first image. Using the described techniques, that same visual effect can then be automatically applied to the other images in which the bride and groom appear e.g., so that in each of the other images the bride and groom are shown in color and the other portions of the image are black and white.

In the following discussion, an example environment is first described that may employ the techniques described herein. Example embodiment details and procedures are then described which may be performed in the example environment as well as other environments. Consequently, performance of the example procedures is not limited to the example environment and the example environment is not limited to performance of the example procedures.

Example Environment

Figure 1:
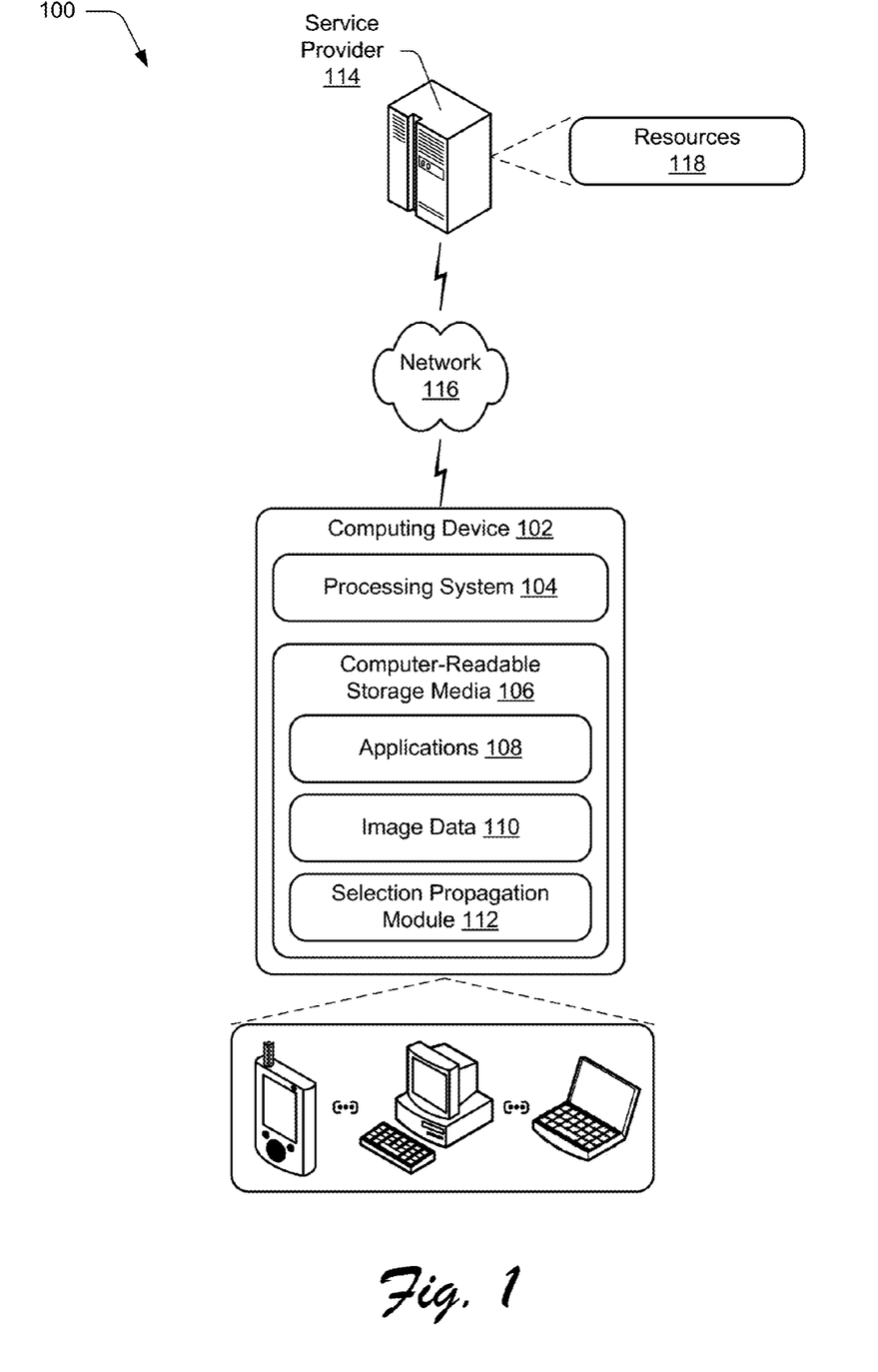
FIG. 1 is an illustration of an environment in an example embodiment that is operable to employ techniques described herein.

FIG. 1 is an illustration of an environment 100 in an example embodiment that is operable to employ techniques described herein. The illustrated environment 100 includes a computing device 102 having a processing system 104 that may include one or more processing devices (e.g., processors) and one or more computer-readable storage media 106. The illustrated environment 100 also includes applications 108, image data 110, and a selection propagation module 112 embodied on the computer-readable storage media 106 and operable via the processing system 104 to implement corresponding functionality described herein. In at least some embodiments, the computing device 102 may include functionality to access web-based resources (e.g., content and services), browse the Internet, interact with online providers, and so forth as described in further detail below.

The computing device 102 may be configured as any suitable type of computing device. For example, the computing device 102 may be configured as a desktop computer, a laptop computer, a mobile device (e.g., assuming a handheld configuration such as a tablet or mobile phone), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 8.

The environment 100 further depicts one or more service providers 114, configured to communicate with computing device 102 over a network 116, such as the Internet, to provide a "cloud-based" computing environment. Generally speaking, a service provider 114 is configured to make various resources 118 available over the network 116 to clients. In some scenarios, users may sign up for accounts that are employed to access corresponding resources from a provider. The provider may authenticate credentials of a user (e.g., username and password) before granting access to an account and corresponding resources 118. Other resources 118 may be made freely available, (e.g., without authentication or account-based access). The resources 118 can include any suitable combination of services and/or content typically made available over a network by one or more providers. Some examples of services include, but are not limited to, photo editing services, image illustrating services, photo printing services (e.g., Snapfish®, Shutterfly®, and the like), photo storage and/or sharing services (e.g., Flickr®), social network services (e.g., Facebook®, Twitter®, Instagram®, and the like), and so forth.

These sources may serve as significant amounts of image content. Image data 110 may represent such image content, which may be formatted in any of a variety of image formats, including but not limited to JPEG, TIFF, RAW, GIF, BMP, PNG, and so on. The image content made available through the services may be posted by users that have accounts with those services. For example, a user having an account with a photo storage and/or sharing service may upload images, such as those taken with a digital camera of the user, or those sent to the user via electronic means. A user of the photo storage and/or sharing service may then share their uploaded images with others, such as by providing a link to photo albums or to a profile of the user.

The selection propagation module 112 may represent functionality to implement techniques for propagating object selection across multiple images as described herein. For example, the selection propagation module 112 may be configured in various ways to automatically select an object from multiple images (e.g., included in image data 110) that was initially selected from a first image (e.g., also included in image data 110) according to user selection inputs. To do so, the selection propagation module 112 may be configured to ascertain features from the first image that are representative of the selected object.

For example, the selection propagation module 112 may extract the features from the image using a scale invariant transform (SIFT) that provides a feature description of the object. The selection propagation module 112 may determine whether a second image, chosen for propagation of the selection, includes features that resemble those ascertained from the first image. Once the selection propagation module 112 determines whether features of the second image resemble the ascertained features, the selection propagation module 112 may then divide the second image into regions.

In particular, the selection propagation module 112 may divide the second image into regions, such that each of the regions includes pixels that are similar within the region, one pixel to another. The selection propagation module 112 may then combine some of the regions of the other image to automatically select the object from the second image. The regions that the selection propagation module 112 combines may be those having the features resembling the features ascertained from the source image.

The selection propagation module 112 may be implemented as a software module, a hardware device, or using a combination of software, hardware, firmware, fixed logic circuitry, etc. Further, the selection propagation module 112 may be implemented as a standalone component of the computing device 102 as illustrated. In addition or alternatively, the selection propagation module 112 may be configured as a component of an application 108, an operating system of the computing device 102, a plug-in module, a standalone service or a service integrated with other services, or other device application.

In at least some embodiments, the selection propagation module 112 is configured to operate in connection with content editing applications that may use application-specific and/or proprietary formats. By way of example and not limitation, one of the applications 108 may be configured as an image editor application one example of which is Adobe Photoshop®. Other content and image editor applications are also contemplated.

Having considered an example environment, consider now a discussion of some example details of the techniques for propagating object selection across multiple images in accordance with one or more embodiments.

Propagating Object Selection Across Multiple Images

Figure 2:
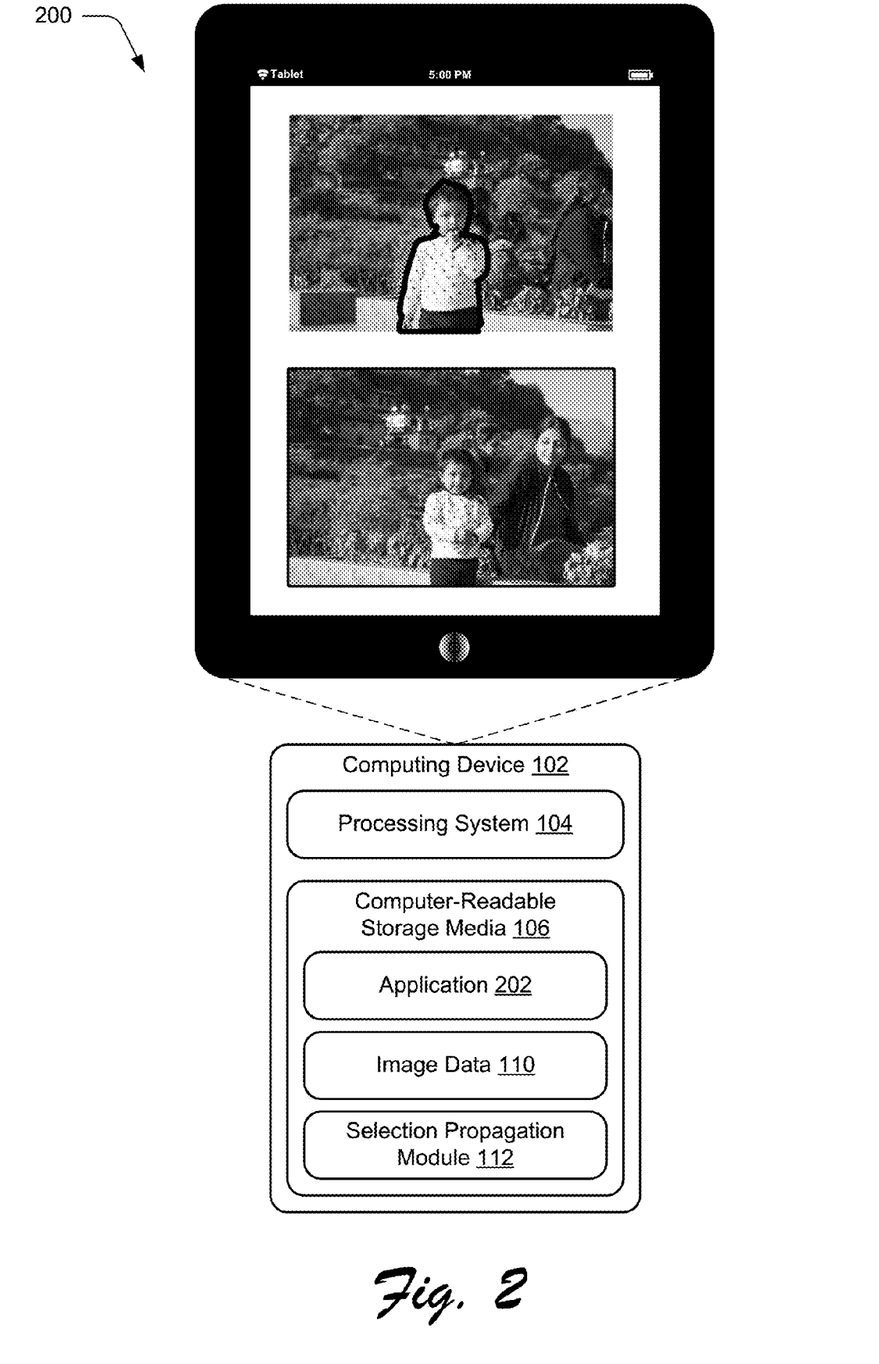
FIG. 2 illustrates portions of the environment from FIG. 1 in greater detail in accordance with one or more embodiments.

This section describes some example details of propagating object selection across multiple images in accordance with one or more embodiments. FIG. 2 depicts generally at 200 some portions of the environment 100 of FIG. 1, but in greater detail. In particular, the computer-readable storage media 106 and the components included therein are depicted in greater detail. The computer-readable storage media 106 includes the image data 110, selection propagation module 112, and an application 202, which may correspond to one of the applications 108 depicted in FIG. 1. Application 202 may correspond to an image editor application, for example.

In general, the selection propagation module 112 is accessible to an application, such as application 202. In at least some embodiments, the selection propagation module 112 may be included as part of the application 202. Thus, the selection propagation module 112 may be specific to the application 202, and provide functionality to propagate object selection across multiple images for the application 202 but not other applications. In other embodiments, the selection propagation module 112 may be separate from the application 202 but accessible to the application 202. For example, the selection propagation module 112 may be configured as a library available to the application 202, an application programming interface (API) available to the application and/or other applications, as a component of an operating system available to multiple applications running within the operating system, to the operating system itself, and so on. Other configurations of the selection propagation module 112 may also be employed without departing from the spirit and the scope of the techniques described herein.

Regardless of how implemented, the selection propagation module 112 may be configured to propagate selection of an object in one images to other images. To select an object from a first image (e.g., a source image), selection inputs may be received to identify the object in the image, such as through a user interface of application 202. For example, a user may drag a cursor around an outline of the object to select the object. Alternately, the source image may be divided into regions and the user may select each of the regions in the source image that correspond to the object. It is to be appreciated that the object may be selected from the source image in various other ways without departing from the scope of the techniques described herein.

Once the object is selected from the source image, the selection propagation module 112 may ascertain features from the image that are representative of the object. For example, the selection propagation module 112 may extract the features from the source image using a scale invariant transform (SIFT). Objects appearing in a given image generally correspond to several points in the given image that represent the object uniquely. Using SIFT, those points can be extracted from the given image to provide a feature description of the object.

The SIFT technique enables features to be extracted from the given image that are not affected by complications, such as scaling, rotation, or translation of the object. As part of extracting features from an image, application of the SIFT technique involves transformation of the image into a collection of local feature vectors, each of which is invariant to scaling, rotation, or translation of the image. The selection propagation module 112 may use the feature description provided by application of the SIFT technique to locate the object in an image containing other objects.

The selection propagation module 112 may also extract features from a target image to which selection of the object is to be propagated. A user may choose the target image for automatic selection of the object through a user interface of application 202. In addition or alternately, the user may choose multiple target images from which the object is to be automatically selected through the user interface. The selection propagation module 112 may then extract features of the target images using a technique for extracting the features.

Once the feature descriptions have been extracted from the source and target images, the selection propagation module 112 may determine which features from the target image resemble the features of the object selected from the source image. In doing so, the selection propagation module 112 attempts to match the features from the source image that describe the object with the features extracted from the target image.

To perform the matching, the selection propagation module 112 may use a technique to track the features from one image to another. For example, the selection propagation module 112 may use a modified Kanade-Lucas-Tomasi (KLT) feature tracker. The KLT feature tracker uses spatial intensity to search for features of the target image that yield the best match with the features of the selected object. However, the KLT feature tracker employed by the selection propagation module 112 is considered "modified" insofar as it considers a relative position of features in the source and target images.

Figure 3:
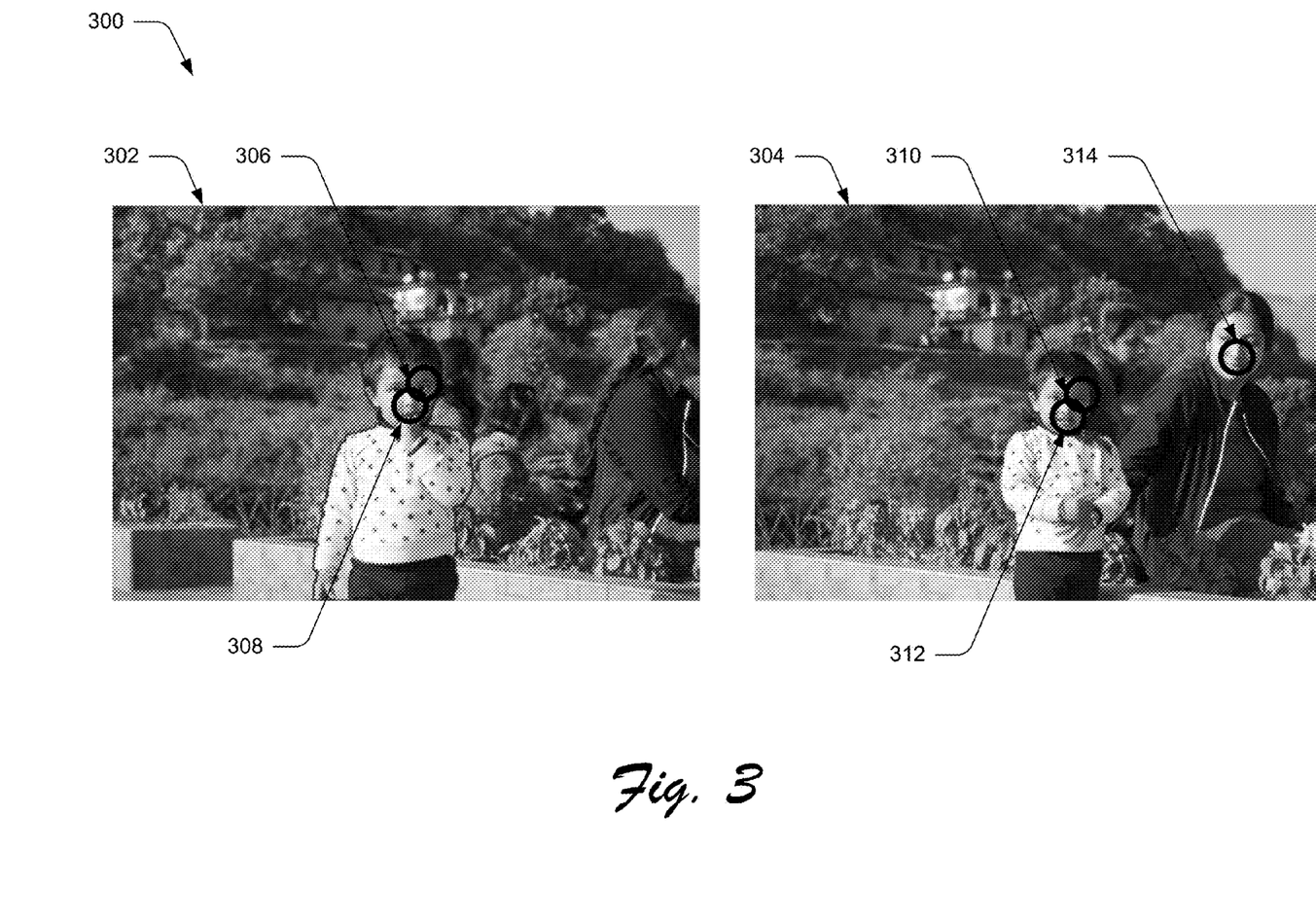
FIG. 3 is an example embodiment showing selection of an object from a source image that is to be propagated to a target image, which includes features that resemble features of the source image.

FIG. 3 illustrates at 300 an example in which selection of an object from a source image 302 is to be propagated to a target image 304, which includes features that resemble features of the source image. In particular, the example illustrated in FIG. 3 indicates how a modified feature tracker may use relative positions of features to propagate selection of an object from the source image 302 to the target image 304. In this example, a user may have manually selected the boy depicted in the source image 302. The user may also have chosen the target image 304 for propagation of that selection e.g., so that the boy is automatically selected from target image 304. As part of propagating the selection, the selection propagation module 112 may have used SIFT to ascertain that features 306 (e.g., the boy's eye in the source image), 308 (e.g., the boy's nose in the source image 302) are representative of the object (e.g., the boy) selected from source image 302.

Given the features extracted from the target image, the selection propagation module 112 may determine that feature 310 (e.g., the boy's eye in the target image 304) resembles feature 306 (e.g., the boy's eye in the source image), but that both feature 312 (e.g., the boy's nose in the target image 304) and feature 314 (e.g., the woman's nose in the target image 304) resemble feature 308 (e.g., the boy's nose in the source image 302). Accordingly, the selection propagation module may consider feature 310 to uniquely match feature 306, but may consider feature 312 and feature 314 merely candidates for matching with feature 308. Clearly, the woman's nose in target image 304 does not correspond to the boy's nose in source image 302.

The selection propagation module 112 may reconcile the features of a target image that are candidates to match a feature in a source image. The selection propagation module 112 may do so based on a relative distance between the features in the source image and the features in the target image. For example, the selection propagation module 112 may compute a first relative distance between feature 306 (e.g., the boy's eye in the source image 302) and feature 308 (e.g., the boy's nose in the source image 302). The selection propagation module 112 may also compute a second relative distance between feature 310 (e.g., the boy's eye in the target image 304) and feature 312 (e.g., the boy's nose in the target image 304), and a third relative distance between feature 310 (e.g., the boy's eye in the target image 304) and feature 314 (e.g., the woman's nose in the target image 304).

The selection propagation module 112 may then compare the relative distances, such that the first relative distance is compared to both the second and third relative distances. In this example, the comparison may indicate that the first relative distance is closer to the second relative distance than the third relative distance. Consequently, the selection propagation module 112 may determine that the candidate feature associated with the second relative distance (e.g., feature 312—the boy's nose in target image 304) matches feature 308 from the source image 302. In addition, the selection propagation module 112 may designate feature 314 as an outlier or a "bad" match for feature 308 from the source image.

Once a determination has been made as to the features of the target image that correspond to the features of the source image, the selection propagation module 112 may divide the target image into regions, such that each of the regions includes pixels that are determined to be similar within the region, one pixel to another.

Figure 4:
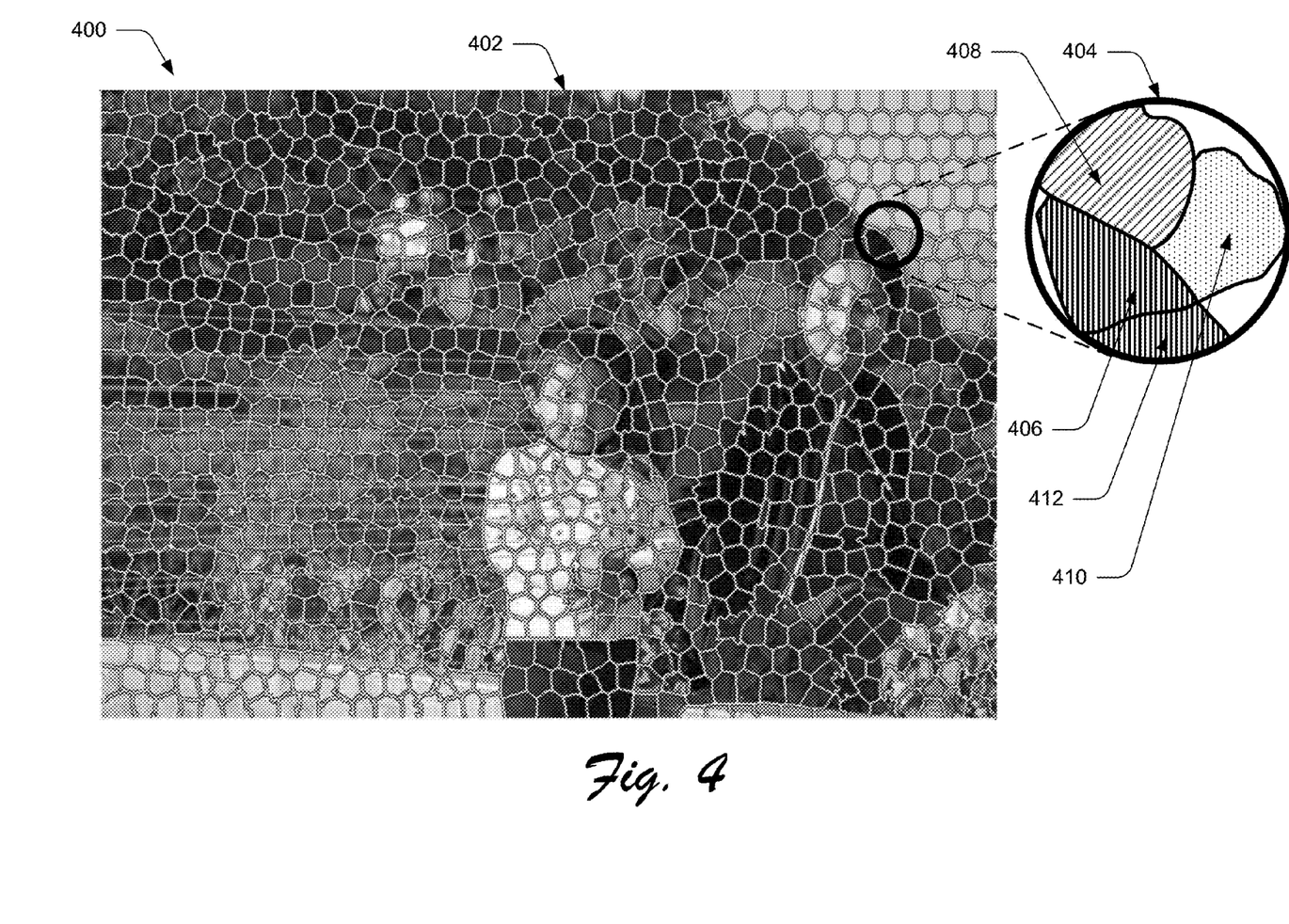
FIG. 4 is an example embodiment showing an image that is divided into regions, each of which includes pixels that are determined to be similar within the region.

FIG. 4 illustrates an example at 400 in which a target image 402 is divided into regions. To divide an image into regions, the selection propagation module 112 may first choose pixels throughout the image as "seed" pixels for the regions. The selection propagation module 112 may then "grow" the regions from the seed pixels. To grow the regions from the seed pixels, the selection propagation module 112 may determine whether pixels neighboring a seed pixel are similar to the seed pixel. If the neighboring pixels are determined to be similar to the seed pixel, then the neighboring pixels may be added to the region associated with the seed pixel. However, neighboring pixels that are determined not to be similar to the seed pixel may be designated as additional seed pixels, such that regions may be grown from those seed pixels.

Whether neighboring pixels are similar to seed pixels may be determined based on a comparison of pixel densities of the neighboring pixels to a pixel density of the seed pixel. The selection propagation module 112 may determine that neighboring pixels are similar to the seed pixels if a similarity between the pixel density of the neighboring pixels and the seed pixels exceeds a similarity threshold. The similarity threshold may be adjustable by a user. Alternately, the similarity threshold may be determined by a component of application 202 based on characteristics of the image being divided, such as a resolution of the image, a format of the image, compression of the image, and so on.

Using this technique, the target image 402 depicted in FIG. 4 may be divided into multiple regions. The exploded view 404 depicts representations of some of the regions of the target image 402 in greater detail. Exploded view 404 includes representations of regions 406, 408, 410, 412. Each of the regions 406, 408, 410, 412, represents pixels that are determined to be similar within the region, one pixel to another. Specifically, the region 406 represents pixels of target image 402 that are similar to one another. The region 408 also represents pixels of target image 402 that are similar to one another. However, the pixels represented by region 408 may be considered dissimilar to the pixels represented by region 406. This may be the case because regions 406, 408 were grown from different seed pixels. Alternately, a determination may have been made while growing one of those regions that pixels neighboring the growing region were not similar enough to the pixels of the region to be added to the region. Consequently, the dissimilar pixels may have been used as seed pixels for the other region.

By forming the regions in this way, the boundaries of the regions will have edges that also correspond to boundaries of the objects present in the image. Considering the example in FIG. 4, regions 406, 412 may correspond to the hair of the woman in the target image 402. Further, the boundaries of regions 406, 412 between regions 408, 410 may correspond to the boundary of the woman's hair with the background of target image 402. Given the division of pixels in this way, regions into which an image is divided may be combinable in a manner that separates the objects depicted in the image.

Once the target image is divided into regions, the selection propagation module 112 may combine some of the regions of the target image to automatically select the object from target image. The selection propagation module 112 represents functionality to combine the regions of the target image that have feature correspondences with the source image. As discussed in more detail above, the selection propagation module 112 may determine which of the features of a target image match features that describe an object selected from a source image. Those matched features of the target image are each located within one of the regions into which the target region is divided. Accordingly, the selection propagation module 112 may combine the regions within which those matched features are located.

When the regions of the target image are combined, at least two different cases may result. In a first case, the combined regions cover an entirety of the object that is to be selected from the target image. In this case, the selection propagation module 112 may simply form a selection of the object from the target image using solely the combined regions. In a second case, the combined regions may merely cover a perimeter of the object that is to be selected from the target image. This may be the case where the perimeter of the object is interesting (e.g., includes extractable features), but where the inside of the object is not interesting (e.g., is all a substantially similar color with little or no contrast). In the second case, the selection propagation module 112 may form a selection of the object from the target image using the combined regions as well as regions enclosed by the combined regions. Doing so enables the selection propagation module 112 to select the object as a whole, including a center of the object that may lack features of interest.

In any case, based on the combined regions, the selection propagation module 112 may select the object from the target image automatically. The selection is considered "automatic" because the selection propagation module 112 selects the object without receiving selection inputs from a user relative to the target image. The selection propagation module 112 may perform this automatic selection for multiple target images, such that selection inputs are not received relative to any of the multiple target images. Instead, selection inputs may be received relative solely to the source image.

Figure 5:
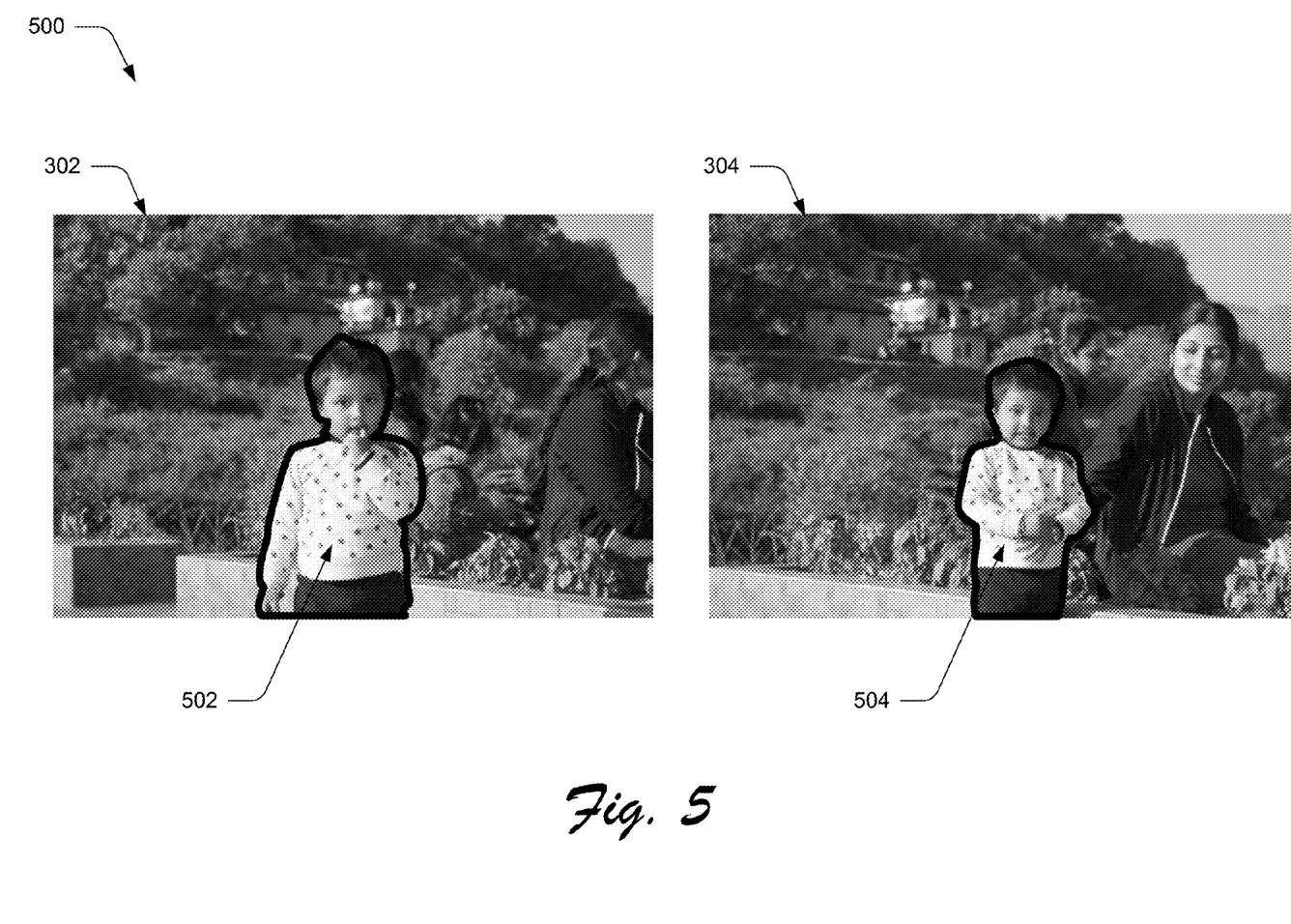
FIG. 5 is an example embodiment showing an image for which selection of an object was made according to selection inputs and an image for which the object was selected automatically.

FIG. 5 illustrates at 500 an example showing an image for which selection of an object was made according to selection inputs, and an image for which the object was selected automatically. The boy depicted in source image 302 may be selected according to selection inputs. To do so, a user may perform selection inputs through a user interface of application 202. These selection inputs may be effective to select the depicted boy from the source image 302, which is indicated by selection 502. The user may then choose to have the selection propagated to target image 304. Using the techniques describe herein, the selection propagation module 112 may automatically select the boy from the target image 304, which is indicated by selection 504.

A user may perform selection inputs relative to a source image on a first device, such as a desktop. The user may do so because it is easier to provide such selection inputs using the first device than using another device, such as a device with fewer or different resources (e.g., tablet or mobile phone). Specifically, selecting an object by dragging a cursor around the object when displayed on a large screen may be easier than other ways to select the object. Applying visual effects to an image may be just as easy on portable device (e.g., a tablet or mobile phone) as on a desktop, however. Due to the convenience of portable devices, a user may prefer to apply visual effects to the source image and target images using a portable device.

In embodiments, an indication of the selection from the source image can be communicated from one device to another. The indication, for instance, may be communicated in conjunction with the source image. Alternately the indication may be communicated to the other device separately from the source image. Using this indication, the selection propagation module 112 may perform automatic selection of an object from target images at a different device than was used to perform selection of the object from the source image.

Based on propagating selection of the object to other images, the selection propagation module 112 may also propagate application of visual effects to the other images. Considering again the example of the wedding photographs, a wedding photographer may wish to apply a visual effect to multiple images in which a bride and groom appear. For example, the photographer may wish to show the bride and groom in color, but the other parts of the images in black and white. To achieve this effect in the source image, the photographer may perform selection inputs through a user interface of application 202 to select the bride and groom from the source image. The photographer may then perform effect application inputs through the user interface of application 202 to apply a visual effect to the other portions of the source image, e.g., apply a black and white filter. The selection of the bride and groom may enable effects to be applied to them (or not applied to them) separately from the other portions of the image.

Given the selection from the source image and the applied effects, the selection propagation module 112 may select the object from other chosen images (target images) and apply the effects to those images. For example, the selection propagation module 112 may automatically select the bride and groom from each of the target images. The selection propagation module 112 may then automatically apply the same effects that are applied to the source image to each of the target images.

For each source image in this example, the selection propagation module 112 may leave the selected bride and groom in color, but apply a black and white filter to the other portions of the image. The selection propagation module 112 may be capable of doing this for each of the wedding photographs uploaded by the photographer. As such, the wedding photographer may perform selection of the bride and groom in just a single photograph, and application of visual effects to the bride and groom also in just the single photograph. The techniques described herein may enable propagation of that selection and effect application to each of the other wedding photographs. It is to be appreciated that several visual effects, in addition to effects that leave a selected portion of an image as is, but filter the unselected portions, are within the scope of the techniques described herein. By way of example and not limitation, such effects may include changing a blur, applying a red-eye fix, fixing a complexion, changing saturation, and so on.

Having discussed example details of the techniques for propagating object selection across multiple images, consider now some example procedures to illustrate additional aspects of the techniques.

Example Procedures

This section describes example procedures for propagating object selection across multiple images in one or more embodiments. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed by a suitably configured device, such as the example computing device 102 of FIG. 1 that makes use of a selection propagation module 112.

Figure 6:
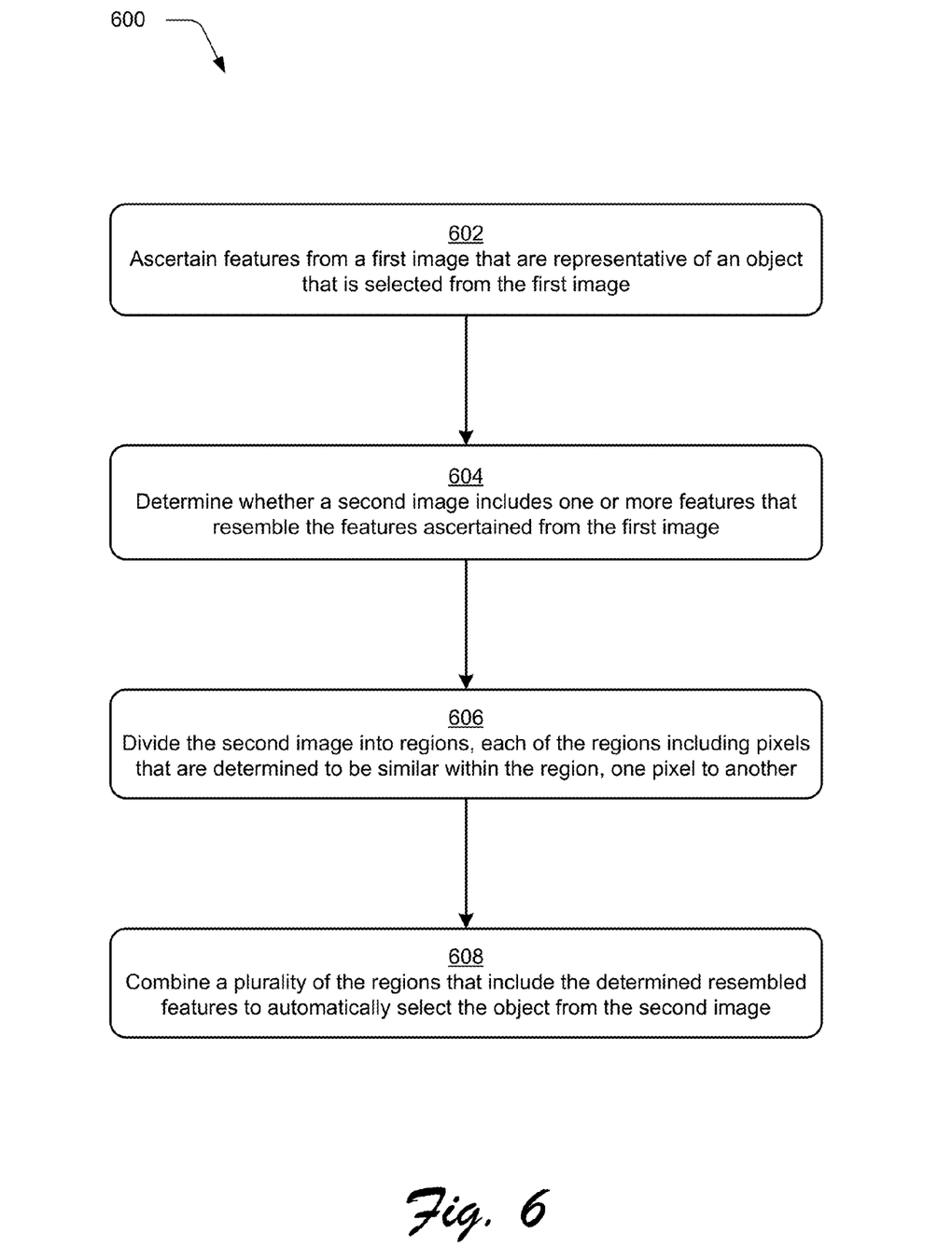
FIG. 6 is a flow diagram depicting an example procedure in accordance with one or more embodiments.

FIG. 6 depicts an example procedure 600 in which selection of an object from a first image is propagated to a second image. Features are ascertained from a first image that are representative of an object selected from the first image (block 602). For example, the selection propagation module 112 ascertains features from a source image that represent an object selected from the source image. To do so, the selection propagation module 112 may employ scale invariant transform (SIFT) techniques to extract a feature description of the object.

A determination is then made as to whether a second image includes features that resemble the features ascertained from the first image (block 604). For example, the selection propagation module 112 determines features of a target image that resemble the features, ascertained at block 602, of the selected object. To do so, the selection propagation module 112 may employ a modified Kanade-Lucas-Tomasi (KLT) feature tracker to match features of the target image with the features, ascertained at block 602, of the selected object. Use of the KLT feature tracker results in determining that some of the features in the target image resembling the features of the selected object are "bad" matches, and do not correspond to the features of the selected object.

Responsive to a determination that features in the second image resemble features ascertained from the first image, the second image is divided into multiple regions, such that each of the regions includes pixels that are determined to be similar within the region, one pixel to another (block 606). For example, the selection propagation module 112 divides the source image into multiple regions. The selection propagation module 112, for instance, can divide the source image based on pixel densities. Using the pixel densities, the selection propagation module determines whether neighboring pixels are similar one to another. Neighboring pixels that are determined to be similar are grouped together into regions. Neighboring pixels that are determined to be dissimilar are separated into different regions. Consequently, the pixels in each region are similar within the region, one pixel to another.

Once the second image is divided into the multiple regions, the regions that include the features resembling those ascertained from the first image are combined (block 608). The combined regions are usable to select the object from the second image. For example, the selection propagation module 112 can determine which regions of the target image include the features of the target image that resemble the features ascertained from the source image. The selection propagation module 112 can then combine those regions. In cases where the combined regions cover an entirety of the object in the target image, the selection can be made using just the combined regions. However, in cases where the combined regions merely cover a perimeter of the object in the target image, the selection can be made using both the combined regions as well as the regions enclosed by the combined regions.

Figure 7:
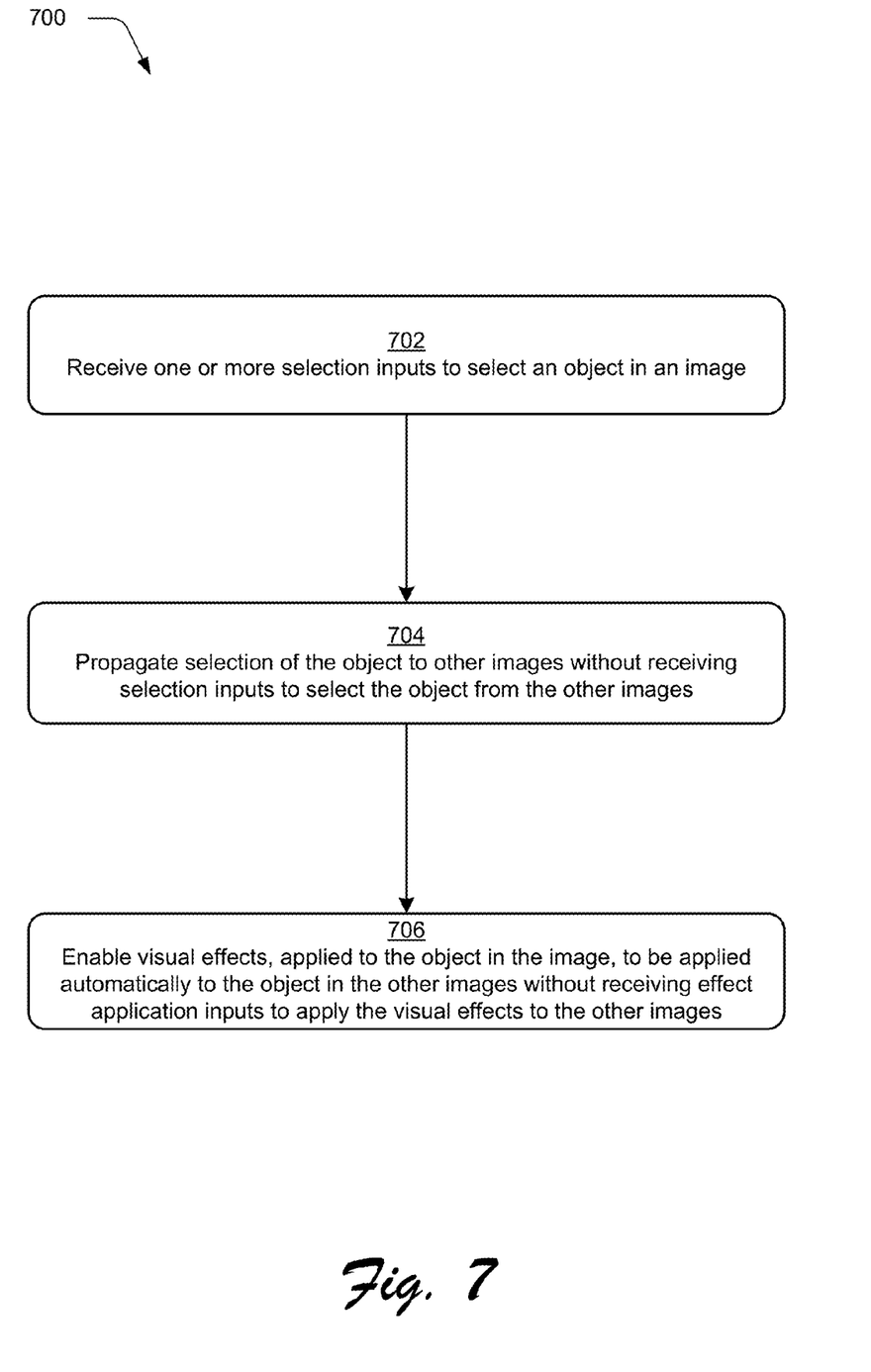
FIG. 7 is another flow diagram depicting another example procedure in accordance with one or more embodiments.

FIG. 7 depicts an example procedure 700 in which selection of an object from an image is propagated to other images, and in which the selection enables visual effects applied to the object in the first image to be automatically applied to the other images. Selection inputs are received to select an object in an image (block 702). For example, a user may perform selection inputs through an image editor application relative to a source image to select an object from the source image. Given the selection inputs, the selection propagation module 112 may ascertain features of the object selected from the source image, as in block 602.

Selection of the object may then be propagated to other images without receiving selection inputs to select the object from the other images (block 704). For example, the selection propagation module 112 may perform the acts of blocks 604-608 to automatically select the object from one or more target images. The target images may be chosen by a user for propagation of the selection. A user may, for instance, choose the target images through a user interface of an image editor application that allows files to be opened. Once the images are chosen for propagation, the selection propagation module 112 may automatically select the object from the target images, such that selection inputs are not received from a user to individually select the object from each of the target images. The automatic selection of the object from multiple images can save a user significant time, since doing so for even one image can be time-consuming.

Based on the selection of the object in the other images, automatic application of visual effects to the object in other images may be enabled (block 706). Specifically, the visual effects may be applied to the other images without receiving effect application inputs to apply the visual effects to those images. For example, a user may perform effect application inputs through a user interface of application 202 to apply visual effects to the object selected in the source image. Given the automatic selection of the object in the target images and the visual effects applied to the source image, the selection propagation module 112 may automatically apply the visual effects to the target images. Importantly, the visual effects applied in the source image are applied relative to the selected object in the source image. Accordingly, the selection propagation module 112 carries this application over to the target images, such that the visual effects are applied in the target images relative to the automatically selected object in the target images.

Having described example procedures in accordance with one or more embodiments, consider now an example system and device that can be utilized to implement the various techniques described herein.

Example System and Device

Figure 8:
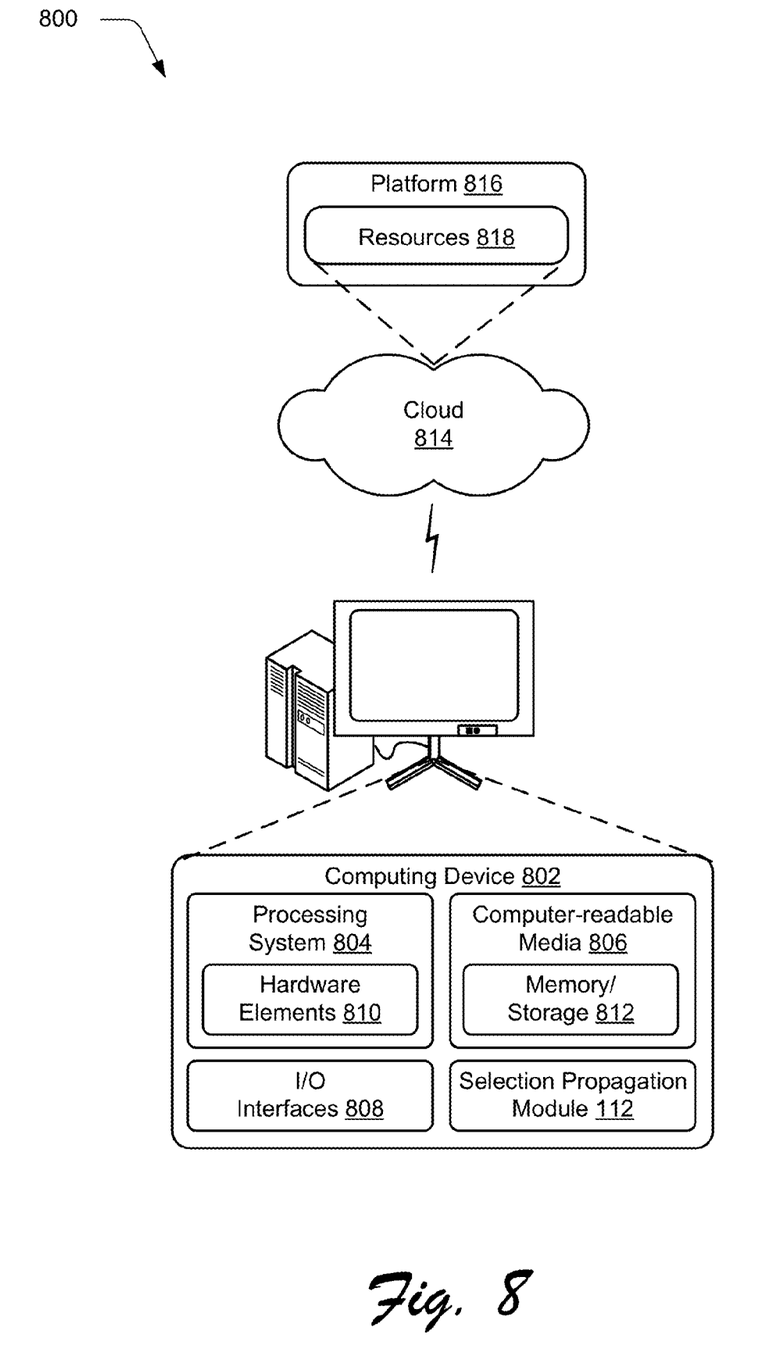
FIG. 8 illustrates an example system including various components of an example device that can be employed for one or more embodiments of propagating object selection across multiple images described herein.

FIG. 8 illustrates an example system generally at 800 that includes an example computing device 802 that is representative of one or more computing systems and/or devices that may implement the various techniques described herein. This is illustrated through inclusion of the selection propagation module 112, which operates as described above. The computing device 802 may be, for example, a server of a service provider, a device associated with a client (e.g., a client device), an on-chip system, and/or any other suitable computing device or computing system.

The example computing device 802 illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
   ascertaining features from a first image that are representative of an object of the first image;
   determining whether a second image includes one or more features that resemble the features ascertained from the first image;
   responsive to a determination that a plurality of the features of the second image resemble at least one of the features of the first image, dividing the second image into similar-pixel regions, each of the similar-pixel regions including pixels that are determined to have less than a threshold difference in pixel density with respect to a seed pixel of the similar-pixel region;
   determining the similar-pixel regions of the second image that include the determined resembled features; and
   combining the similar-pixel regions of the second image that include the determined resembled features to automatically select the object from the second image.

2. A computer-implemented method as described in claim 1, further comprising receiving input to select the object from the first image.

3. A computer-implemented method as described in claim 1, further comprising receiving input to choose the second image for automatic selection of the object from the second image.

4. A computer-implemented method as described in claim 1, further comprising performing the determining, dividing, and combining to automatically select the object from multiple images.

5. A computer-implemented method as described in claim 1, wherein the ascertaining of the features that are representative of the object from the first image includes using a scale invariant feature transform (SIFT) that provides a feature description of the object.

6. A computer-implemented method as described in claim 1, further comprising reconciling whether the one or more features of the second image, that resemble the features ascertained from the first image, do not correspond to the features ascertained from the first image based on a distance between at least two of the features ascertained from the first image and distances between candidate features in the second image and at least one feature in the second image that corresponds to one of the at least two features of the first image.

7. A computer-implemented method as described in claim 1, further comprising reconciling whether the one or more features of the second image, that resemble the features ascertained from the first image, do not correspond to the features ascertained from the first image by:
   computing a first distance that spans between a first and second feature ascertained from the first image as representative of the object, the first feature having a uniquely corresponding feature in the second image and the second feature resembled by at least two candidate features in the second image;
   computing a second distance that spans between the uniquely matching feature and a first of the at least two candidate features in the second image;
   computing a third distance that spans between the uniquely matching feature and a second of the at least two candidate features in the second image; and
   comparing the second distance and the third distance to the first distance to determine which of the first candidate feature or the second candidate feature does not correspond to the second feature ascertained from the first image.

8. A computer-implemented method as described in claim 1, wherein dividing the second image into the similar-pixel regions includes:
   choosing pixels throughout the second image as the seed pixels for the similar-pixel regions;
   determining if pixels that neighbor the seed pixels are similar to the seed pixels; and
   adding, to the seed pixels, the neighboring pixels that are determined to be similar to the seed pixels to form the similar-pixel regions of the second image.

9. A computer-implemented method as described in claim 8, further comprising designating the neighboring pixels that are determined not to be similar to the seed pixels as additional seed pixels for the similar-pixel regions.

10. A computer-implemented method as described in claim 1, wherein the similar-pixel regions that include the determined resembled features cover an entirety of the object in the second image, and combining the similar-pixel regions involves combining solely the similar-pixel regions that include the determined resembled features of the second image.

11. A computer-implemented method as described in claim 1, wherein the similar-pixel regions that include the determined resembled features cover a perimeter of the object in the second image, and combining the plurality of similar-pixel regions involves combining the similar-pixel regions that cover the perimeter and the similar-pixel regions that are enclosed by the similar-pixel regions that cover the perimeter.

12. A computer-implemented method comprising:
receiving one or more selection inputs to select an object in an image;
propagating selection of the object to one or more other images without receiving selection inputs to select the object from the one or more other images, including:
dividing the one or more other images into similar-pixel regions, each of the similar-pixel regions including pixels having less than a threshold difference in pixel density with respect to a seed pixel of the similar pixel region; and
determining the similar-pixel regions of the one or more other images that include features determined to represent the object, the determined features extracted from the image to represent the object, and the determined similar-pixel regions of a respective said other image combined to select the object; and
enabling visual effects, applied relative to the object in the image and not applied to a remainder of the image according to effect application inputs, to be applied to the object in the one or more other images and not applied to a remainder of the one or more other images, the visual effects being applied automatically to the object in the one or more other images without receiving effect application inputs to apply the visual effects in the one or more other images.

13. A computer-implemented method as described in claim 12, further comprising receiving the effect application inputs to apply the visual effects to the object in the image.

14. A computer-implemented method as described in claim 12, further comprising:
receiving one or more additional selection inputs to select at least one other object in the image; and
propagating selection of the at least one other object to the one or more other images without receiving selection inputs to select the at least one other object from the one or more other images.

15. A computer-implemented method as described in claim 12, wherein propagating selection of the object to the one or more other images without receiving selection inputs to select the object from the one or more other images includes:

extracting the features from the image that represent the object;
determining whether the one or more other images include one or more of the features extracted from the image;
combining the determined similar-pixel regions of the respective said other image to automatically select the object from the respective said other image.

16. A computer-implemented method as described in claim 12, wherein enabling the visual effects to be applied to the object in the one or more other images enables the visual effects to be applied at a device that is different from the device at which the one or more selection inputs are received.

17. A device comprising:
a selection propagation module implemented at least partially in hardware, the selection propagation module configured to perform operations comprising:
ascertaining features from a source image that are representative of an object selected from the source image according to selection inputs received through a user interface of an image editor application;
determining whether a target image includes one or more features that resemble the features ascertained from the source image; and
selecting the object from the target image based on a determination as to the features in the target image that resemble the features ascertained from the source image and without receiving selection inputs through the user interface to select the object from the target image, selection of the object from the target image including dividing the target image into similar-pixel regions that include pixels determined to have less than a threshold difference in pixel density with respect to a seed pixel of the similar-pixel region and determining the similar-pixel regions of the target image that include the features in the target image that resemble the features ascertained from the source image.

18. A device as described in claim 17, wherein the operations further comprise generating an indication of the object selected from the source image, the indication enabling selection of the object from another target image at another device without receiving selection inputs at the other device to select the object from the other target image.

19. A device as described in claim 17, wherein the image editor application is usable to apply a visual effect to the object selected from the source image, and the operations further comprise propagating the visual effect to the object selected from the target image.

20. A device as described in claim 19, wherein the visual effect is propagated to the object selected from the target image without receiving effect application inputs to apply the visual effect to the object selected from the target image.

* * * * *

UNITED STATES PATENT AND TRADEMARK OFFICE
CERTIFICATE OF CORRECTION

PATENT NO. : 9,443,134 B2
APPLICATION NO. : 14/279059
DATED : September 13, 2016
INVENTOR(S) : Gupta et al.

Page 1 of 1

It is certified that error appears in the above-identified patent and that said Letters Patent is hereby corrected as shown below:

In the Claims
Column 17, line 24, delete "similar pixel", insert -- similar-pixel --, therefor.

Signed and Sealed this
Eighth Day of November, 2016

Michelle K. Lee
*Director of the United States Patent and Trademark Office*